United States Patent [19]
Corte et al.

[11] 3,856,715
[45] Dec. 24, 1974

[54] GUANIDINE GROUP CONTAINING ANION EXCHANGE RESINS FROM AMINO GROUP CONTAINING RESINS AND CYANAMIDES

[75] Inventors: Herbert Corte, Opladen; Harold Heller; Michael Lange, both of Koeln; Otto Netz, Leverkusen, all of Germany

[73] Assignee: Bayer Aktiengesellschaft, Leverkusen, Germany

[22] Filed: Dec. 29, 1972

[21] Appl. No.: 319,417

[30] Foreign Application Priority Data
Jan. 5, 1972 Germany............................ 2200457

[52] U.S. Cl................. 260/2.1 R, 71/85, 260/2.1 E
[51] Int. Cl......................... C05c 11/00, C05f 11/00
[58] Field of Search ...................... 260/2.1 R, 2.1 E

[56] References Cited
UNITED STATES PATENTS
2,906,595  9/1959  Pelcak et al. .......................... 21/2.7
3,346,516  10/1967  Minton ................................ 260/2.1

FOREIGN PATENTS OR APPLICATIONS
113,552  2/1967  Netherlands

OTHER PUBLICATIONS
Karrer, Organic Chemistry, Elsevier, New York, 1938 (pp. 208–209).
Helfferich, Ion Exchange, McGraw-Hill, New York, 1962, (p. 53).

*Primary Examiner*—Melvin Goldstein
*Attorney, Agent, or Firm*—Burgess, Dinklage & Sprung

[57] ABSTRACT

Strongly basic anion exchange resins having guanidine groups are prepared by reacting a salt of a polymer-containing primary or secondary amino groups with cyanamide or alkylated cyanamide in the presence of water at a weakly acidic pH value and at an elevated temperature.

18 Claims, No Drawings

GUANIDINE GROUP CONTAINING ANION EXCHANGE RESINS FROM AMINO GROUP CONTAINING RESINS AND CYANAMIDES

The present invention relates to a process for the production of anion exchange resins containing guanidine groups. In different aspect, the invention relates to the use of such resins as fertilizers, especially as nitrogenous fertilizers.

Anion exchangers based on guanidine are known. Earlier patents describe the manufacture of such resins by condensation of guanidine with, for example, formaldehyde. The co-condensation of aromatic amines such as m-phenylenediamine with guanidine derivatives, using formaldehyde as the condensation agent, was also described many years ago. Here, the guanidines are always completely built into the resin matrix (see the summary in R. Griessbach, "Austauschadsorption in Theorie und Praxis" (Exchange Adsorption in Theory and Practice), Akademie-Verlag, Berlin, 1957, page 59). Anion exchangers in which the guanidine groups are only linked to the resin matrix via a nitrogen atom are obtainable according to another earlier process. This latter process is characterized in that primary aromatic amines, such as m-phenylenediamine, are reacted, before or after condensation with aldehydes, with certain nitriles such as cyanamide or dicyandiamide. The process is however restricted to the use of primary aromatic amines (see British Pat. No. 495,401).

As is furthermore known, exchangers based on crosslinked polystyrene resins and containing guanidine groups are produced by reacting halogenomethylated crosslinked copolymers of monovinyl-aromatic monomers and crosslinking agents, such as divinylbenzene, with guanidine or an alkylguanidine.

In this way, insoluble polymeric substances can be manufactured that carry guanidine groups pendant from a mechanically stable lattice substance (see German Auslegeschrift (German Published Specification) No. 1,301,538).

These materials are strongly basic anion exchangers that are distinguished by special properties which are explained in more detail in the aforesaid German Published Specification. The disadvantage of this manufacturing process is that the guanidines must be employed as free bases. This means that the reaction has to be carried out under anhydrous conditions since both the guanidines themselves and the reaction products, namely the polymers containing guanidine groups, in the form of their free bases, are relatively easily split by water to form, for example, ureas.

The present invention provides a process for the production of a strongly basic anion exchanger having guanidine groups.

Essentially, the process of the invention comprises reacting a salt of a polymer containing primary and/or secondary amino groups with cyanamide or an alkylated cyanamide in the presence of water at a weakly acid pH value, preferably at a pH value of between 4.5 and 6.5, and at an elevated temperature.

The present invention, in addition to providing this process, also provides the strongly basic anion exchanger produced thereby.

The process according to the invention avoids the disadvantages of the process described in the above-mentioned German Published Specification No. 1,301,538 since it permits the production of the guanidine resins in a technically simple manner, in an aqueous medium. It thus represents an important technical advance.

To carry out the process according to the invention the polymeric amines, that is to say, for example, weakly basic anion exchangers with primary and/or secondary amino groups, are suspended in water and adjusted, by addition of a suitable acid, for example HCl, to a pH-value of, for example, HCl, to a pH-value of, for example 5.5, which is most favorable for the reaction, as a result of which the amine salts are formed. The addition of water-miscible organic solvents that are inert towards cyanamide is possible but not essential.

The reaction of the amine salts with cyanamide or alkylated cyanamides takes place on vigorous mixing at a slightly acid pH and an elevated temperature. Cyanamide can be used as an aqueous solution, preferably as an approximately 50 percent strength aqueous solution, but also in the form of its salts, for example as calcium cyanamide.

Among the alkylated cyanamides, the water-soluble monoalkylcyanamides and dialkylcyanamides such as monomethylcyanamide, monoethylcyanamide and dimethylcyanamide, can in particular be used.

The cyanamide may be added all at once or in portions in the course of the reaction. The amount of the cyanamide is not critical. In order to react the primary or secondary amino groups as completely as possible, 1-3 moles of cyanamide are generally used per mole of amino group. If less than 1 mole of cyanamide is used per mole of amino group, the reaction product contains, in addition to the strongly basic guanidine groups, also weakly basic primary or secondary amino groups.

The maintenance of a weakly acid pH-value during the entire reaction time is of decisive importance for the success of the reaction. The best results are achieved in the pH range of between 4.5 and 6.5. During the heating-up period it is therefore at times necessary to add alkali to the batch; during the reaction, however, acid is constantly withdrawn from the reaction solution so that further acid must be added in appropriate amount. Aqueous mineral acid is most suitable for this purpose. It is, however, also possible to use buffer solutions.

The reaction temperature is principally of importance with regard to the speed of reaction. It has been found that reaction temperatures of from 60° to 130°C can be used. The temperature range of from 80° to 100°C is preferred. The reaction times permit of great variation and depend mainly on the structure of the amine used.

Suitable starting materials for the guanidisation reaction are all weakly basic anion exchangers which contain primary and/or secondary aliphatic or araliphatic amino groups. Very many processes have been described for the manufacture of such anion exchangers and attention may be drawn here to the relevant summarizing works and to the original literature cited therein. (See R. Griessbach, "Austauschadsorption in Theorie und Praxis," (Exchange Adsorption in Theory and Practice), Akademie-Verlag, Berlin, 1957, pages 56–62; Ullmanns Encycklopadie d. techn. Chemie (Ullmann's Encyclopaedia of Industrial Chemistry, 3rd Edition, 1957, volume 8, page 811).

In addition, there may be mentioned the reaction products of crosslinked, chloromethylated polystyrene resins with amines that contain two or more primary amino groups, and with straight-chain or branched polyalkylenepolyamines or polyethyleneimine, and especially anion exchangers that exclusively, or virtually exclusively, carry primary araliphatic amino groups. The latter are obtained, for example, from crosslinked polystyrene resins (matrix) after chloromethylation and subsequent reaction with potassium phthalimide (see British Patent Specification 767,821) or by aminomethylation (see German Auslegeschrift (German Published Specification), No. 1,054,715), if the resulting reaction products are finally saponified, or by copolymerization of p-vinylbenzylamine with suitable crosslinking agents.

The matrix used is in general a copolymer, in bead form, of a monovinyl-aromatic compound and a crosslinking agent. The crosslinking agent is generally employed in amounts of 1 to 50, preferably 2 to 15, percent relative to the total monomers. Preferred monovinyl-aromatic compounds are styrene, vinyltoluene and vinylnaphthalene. Preferred crosslinking agents are polyvinyl-aromatic compounds such as divinylbenzene, trivinylbenzene or aliphatic polyvinyl compounds such as ethylene glycol dimethacrylate. In all these cases, a so-called macro-porous resin can also be used as the starting material. Such resins are produced, for example, by suspension polymerization of the starting monomers in the presence of an organic solvent that dissolves the monomers but neither dissolves nor swells the resulting copolymer. Such matrices are also known, as is the manufacture of anion exchangers from such matrices (see German Pat. No. 1,045,102). In this context attention may also be drawn to macro-porous anion exchangers of the polyaminostyrene type (see German Pat. No. 1,049,583). Further possible starting materials are non-crosslinked polystyrene resins containing amino groups, to which the same manufacturing principles can be applied.

It is also possible to start from copolymers which carry carboxylic acid ester groups or nitrile groups and to react these with, for example, polyalkylenepolyamines (see German Pat. No. 956,449 and Japanese Patent Application Sho 38-4515).

It is also possible to start from crosslinked or non-crosslinked polyvinylamine, for which various manufacturing processes are again known from the literature (see, for example, German Auslegeschrift (German Published Specification) No. 1,151,120; R. Hart, Ind. chim. Belge 23 (1958), page 251) or from polyethyleneimine or straight-chain or branched polyalkylenepolyamines or technical mixtures thereof.

The exchanger resins with guanidine groups which can be manufactured according to the invention are strongly basic anion exchangers and as such are more or less suitable for all fields of use which are described for these exchangers in the literature. As compared to commercially available strongly basic type I and type II anion exchanger resins with quaternary ammonium groups, they are distinguished by some remarkable properties, such as ease of regeneration and increased heat resistance of the free base form in anhydrous media (see DAS (German Published Specification) No. 1,301,538). They can furthermore be employed for the selective adsorption of heavy metal ions and noble metal ions.

Additionally it has been found that the exchanger resins according to the invention can be used as nitrogenous fertilizers having a slow and long-lasting action and that the nitrate forms are particularly suitable for this purpose. They represent a combination of short-term and long-term fertilizers since the nitrate is immediately available for plant nutrition while the guanidine groups, because of their capacity for degradation, are a nitrogen source, of slow and long-lasting action, for the plant. It is of particular advantage to employ such guanidine group containing anion exchanger resins in the nitrate forms as nitrogenous fertilizers, wherein said anion exchangers contain more than one guanidine group per aromatic nucleus. These exchangers can be obtained for example by the process according to the invention, if one starts from resins which carry more than one primary araliphatic amino group per aromatic nucleus. (Resins of this type are described in the Dutch Pat. No. 113,552). The afore-mentioned highly substituted exchanger resins with guanidine groups show an outstandingly good fertilizing effect.

The nitrates to be used according to the invention are obtained in a manner which is in itself known by treating the ion exchanger with an aqueous solution of a nitrate until complete saturation of the ion-exchanging groups with nitrate ions is reached. It is, however, also possible to employ the nitrate of the polymeric amine in the synthesis and to adjust the pH-value subsequently with nitric acid.

It can at times also be of advantage to employ the anion exchangers according to the present invention, partially or completely in the phosphate form or charged with polyphosphoric acids, as fertilizers, or to employ them in combination with other fertilizers if particular effects are to be achieved.

The exchangers can be in the form of beads, granules or powders and can either be mixed with the substrate, such as peat, or be used as top dressings.

It is furthermore possible to use the exchangers as a source of nitrogen in hydro-cultures.

The invention is illustrated by the following Examples:

EXAMPLE 1

Vegetation tests with annual rye grass/sandy soil The vegetation tests were carried out in flat dishes each containing 2 l of sandy soil as cultivation medium (substrate). For the fertilizing with nitrogen the substrates were mixed with anion exchanger resins according to the invention, wherein said exchanger resins are employed in the nitrate forms in amounts which are stated in Table 1. The supply with potassium, calcium, magnesium, phosphor and sulfur was acchieved by watering with a nitrogen-deficient-solution (see D. R. Hoagland and D. J. Arnon: California Agricultural Experiment Station, Circular 347, Revised January 1950).

In the control test no resin was used as fertilizer and instead of the nitrogen-deficient-solution a complete nutrient solution containing nitrate was employed.

The duration of the tests was 29 weeks. During this time 8 cuts were made all together.

The amounts of nitrate nitrogen per one liter of substrate which were used in each test and the sum of the yields obtained in each test are stated in the following Table 1.

TABLE 1

Vegetation tests with annual rye grass / sandy soil

| exchanger resin according to Example | g of dry exchanger resin per liter of substrate | mg of nitrate nitrogen per liter of substrate | sum of yields (mg of dry-weight per mg of nitrate nitrogen per liter of substrate) |
|---|---|---|---|
| 2 | 3.6 | 185 | 75 |
| 2 | 7.2 | 370 | 51 |
| 4 | 3.8 | 200 | 73 |
| 4 | 7.6 | 400 | 61 |
| 6 | 2.7 | 170 | 87 |
| 6 | 5.4 | 340 | 70 |
| control test without exchanger resin however with complete nutrient solution | | 750 | 23 |

EXAMPLE 2

Vegetation tests with annual rye grass/sandy soil-peatmixture

The vegetation tests were carried out in flat dishes each containing 2 l of a mixture consisting of 25 vol.-% of peat and of 75 vol.-% of sandy soil as cultivation medium (substrate). For the fertilizing with nitrogen the substrates were mixed with anion exchanger resins according to the invention, wherein said exchanger resins are employed in the nitrate forms in amounts which are stated in Table 2. The supply with potassium, calcium, magnesium, phosphor and sulfur was acchieved by watering with a nitrogen-deficient-solution (see D. R. Hoagland and D. J. Arnon: California Agricultural Experiment Station, Circular 347, Revised January 1950).

In the control test no resin was used as fertilizer and instead of the nitrogen-deficient-solution a complete nutrient solution containing nitrate was employed.

The duration of the tests was 29 weeks. During this time 8 cuts were made all together.

The amounts of nitrate nitrogen per one liter of substrate which were used in each test and the sum of the yields obtained in each test are stated in the following Table 2.

tion, the mixture was warmed to 100°C over the course of 45 minutes and stirred at 95°-100°C for 16 hours. During the entire heating period, the pH value in the suspension was kept at between 5.45 and 5.75; for this purpose, 66 ml of sodium hydroxide solution (10% strength) had to be added during the heating-up period and a total of 130 ml of hydrochloric acid (15% strength) had to be added in small portions during the reaction at 95°-100°C. After cooling, the reaction product was washed with fully desalinated water (5 liters) in a filter tube, until the effluent was practically free of chloride. The yield was 1,500 ml of guanidine resin having a salt-splitting capacity of 1.28 equivalents/1 and a total capacity (acid-binding capacity) of 1.76 equivalents/1.

EXAMPLE 4

1,000 ml of a macro-porous weakly basic anion exchanger with primary amino groups and an HCl-binding capacity of 2.3 equivalents (prepared as indicated in Example 1) were stirred with 600 ml of fully desalinated water and with an excess of hydrochloric acid (225 ml of HCl of 38% strength). After 45 minutes, the pH value of the suspension was found to be 1.1 and was raised to 5.1 by adding 80 ml of sodium hy-

TABLE 2

Vegetation tests with annual rye grass / sandy soil-peat-mixture

| exchanger resin according to Example | g of dry exchanger resin per liter of substrate | mg of nitrate nitrogen per liter of substrate | sum of yields (mg of dry-weight per mg of nitrate nitrogen per liter of substrate |
|---|---|---|---|
| 2 | 3.6 | 185 | 83 |
| 2 | 7.2 | 370 | 65 |
| 4 | 3.8 | 200 | 83 |
| 4 | 7.6 | 400 | 71 |
| 6 | 2.7 | 170 | 95 |
| 6 | 5.4 | 340 | 80 |
| control test without exchanger resin, however with complete nutrient solution | | 750 | 29 |

EXAMPLE 3

1,000 ml of a macro-porous weakly basic anion exchanger with primary amino groups and an HCl binding capacity of 2.75 equivalents (produced according to German Pat. No. 1,054,715 by aminomethylation of a macro-porous polystyrene bead polymer crosslinked with 8% of divinylbenzene) were suspended in 1,000 ml of completely desalinated water and converted into the HCl form by slow addition of 2.75 equivalents or concentrated hydrochloric acid. On doing so, the pH value in the suspension became 5.7. After adding 463 g of a 49.5 percent strength aqueous cyanamide soludroxide solution (20% strength). After 140.5 g of a 51.8 percent strength aqueous cyanamide solution had been added, the mixture was warmed to 90°C over the course of 2.5 hours. During this time the pH value dropped to 4.0. After a further 2 hours, a further 140.5 g of the cyanamide solution were added and thereafter the mixture was stirred for a further 18 hours at 89°-90°C and pH 4-5. In order to maintain this pH value, a total of 15 ml of hydrochloric acid (15% strength) had to be added dropwise.

The yield of guanidine resin was 1,465 ml; the salt splitting capacity was 1.0 equivalent/1 and the total capacity was 1.45 equivalents/1.

EXAMPLE 5

1,000 ml of a macro-porous weakly basic anion exchanger with primary amino groups and an HCl-binding capacity 2.44 equivalents (prepared as indicated in Example 1) were suspended in 1,000 ml of fully desalinated water and converted into the HCl form as described in Example 2. Thereafter the pH value in the suspension was 5.2. The suspension was warmed to 100°C and stirred for 4.5 hours at 95°–100°C. During this time, a total of 366 g of calcium cyanamide (80 percent strength technical material) were introduced in 4 portions each of 81.3 g and one portion of 40.8 g and the pH value was constantly kept in the range of 5 –6.5 by adding a total of 590 ml of hydrochloric acid (38% strength). Thereafter the mixture was stirred for a further 3.5 hours, during which a further 15 ml of hydrochloric acid (15% strength) were consumed. After cooling, the entire batch was transferred into a filter tube and backwashed with fully desalinated water (about 50 liters) until completely clear.

The yield of guanidine resin was 1,385 ml; the salt splitting capacity was 1.1 equivalents/l and the total capacity was 1.67 equivalents/l.

EXAMPLE 6

1,000 ml of a gel-type weakly basic anion exchanger, with primary amino groups and an HCl-binding capacity of 3.9 equivalents (produced by aminomethylation of a polystyrene bead polymer crosslinked with 4% of divinylbenzene) were converted into the HCl form as indicated in Example 1 and reacted with 663 g of aqueous cyanamide solution (49.5% strength). After a reaction time of 8 hours at 95°–100°C and pH 5–5.5, the yield of guanidine resin was 1,920 ml; the salt splitting capacity was 1.375 equivalents/l and the total capacity was 1.945 equivalents/l.

EXAMPLE 7

80 ml of the weakly basic exchanger resin used in Example 4 were suspended in 115 ml of fully desalinated water and converted into the HCl form as indicated in Example 2. After the pH value of the suspension had been adjusted to 5.8, 43.8 g of dimethylcyanamide were introduced, after which the mixture was stirred for 26 hours at 100°–102°C and pH 5.5–6.5. To maintain this pH value, a total of 12 ml of sodium hydroxide solution (10% strength) had to be added dropwise to the mixture during the heating-up period, while later 5 ml of hydrochloric acid (15% strength) also had to be added.

The yield of guanidine resin was 175 ml; the salt splitting capacity was 0.98 equivalent/l and the total capacity was 1.52 equivalents/l.

EXAMPLE 8

A polystyrene bead polymer crosslinked with 2% of divinylbenzene was converted into a weakly basic anion exchanger resin of the poly-(aminomethylstyrene) type in accordance with German Pat. No. 1,054,715. The content of amino groups was 16.9 milliequivalents per g of polystyrene resin employed, corresponding to 1.8 amino groups per aromatic nucleus.

500 ml of the anion exchanger thus obtained, having an HCl-binding capacity of 1.63 equivalents, were suspended in 1,000 ml of fully desalinated water and charged with hydrochloric acid as described in Example 2. For reaction with 267 g of aqueous cyanamide solution (49.5% strength), the mixture was stirred for 8 hours at 95°–100°C and at pH 5–5.3. (The hydrochloric-acid consumption was 66 ml of a 15 percent strength solution.)

Yield: 955 ml of guanidine resin (washed); salt splitting capacity: 1.21 equivalents/l; total capacity: 1.59 equivalents/l.

To produce the nitrate form of the guanidine resin, 2.5 percent strength sodium nitrate solution was filtered through 820 ml of the reaction product in a filter tube until the effluent was free of chloride. In the course thereof, the exchanger resin shrunk very greatly. The yield was 390 ml of guanidine resin (nitrate form). The N content of a dried resin sample was 28.4% and the Cl content was < 0.1%.

EXAMPLE 9

73 ml of a macro-porous weakly basic anion exchanger resin with secondary amino groups and an HCl-binding capacity of 0.143 equivalent (produced according to German Auslegeschrift (German Published Specification) No. 1,495,762 by condensation of a macro-porous polystyrene bead polymer, crosslinked with 4% of divinylbenzene, with N-methyl-N-chloromethylacetamide and subsequent saponification) were exhaustively charged with hydrochloric acid in a filter tube. 127 ml of exchanger in the HCl form were obtained and were suspended in 200 ml of fully desalinated water and reacted, as described in Example 1, with 24 g of an approximately 50 percent strength aqueous cyanamide solution in 8 hours at 95°–100°C and pH 5.5. The reaction product was washed with fully desalinated water in a filter tube until the effluent was practically free of chloride. The yield of guanidine resin was 119 ml; the salt splitting capacity was 1.01 equivalents/l and the total capacity was 1.19 equivalents/l.

EXAMPLE 10

500 g of an aqueous polyethyleneimine solution containing 86 g of polyethyleneimine were mixed with 1,730 ml of an approximately 3 percent strength hydrochloric acid so that the pH value of the solution was 5.6. After adding 168 g of an approximately 50 percent strength aqueous cyanamide solution the mixture was heated to 100°C over the course of 2 hours and kept at 95°–100°C. for a further 8 hours. The pH value was continuously readjusted to 5.6–5.75. For this, a total of 75 ml of sodium hydroxide solution (10% strength) had to be added during the heating-up period and a total of 64 ml of hydrochloric acid (15% strength) had to be added during the following 8 hours.

A sample of the reaction solution was dialyzed against fully desalinated water, using a cellophane tube, and the residue was concentrated to dryness in vacuo. The elementary analysis of this product gave a value of 1.4 for the ratio of C : N.

EXAMPLE 11

1,000 ml of a macro-porous weakly basic anion exchanger with primary amino groups and an HCl-binding capacity of 2.75 equivalents (produced as indicated in Example 1) were suspended in 900 ml of fully desalinated water and treated with hydrochloric acid (230 ml of HCl, 39% strength), while stirring, until the pH value of the suspension was constant at 3.9. Thereafter, 206 g of calcium cyanamide (80 percent strength technical material) were introduced, simultaneously with a further 330 ml of concentrated hydrochloric acid. During the addition, slight external cooling was used so as to prevent the temperature in the suspension rising above 15°C. For the reaction, the mixture was stirred for 8 hours at the reflux temperature (105°C) and pH 4.5. In the course thereof, a further 60 ml of hydrochloric acid (39% strength) were consumed.

The guanidine resin thus obtained was backwashed with fully desalinated water in a filter tube until the effluent was clear and was then converted into the nitrate form in accordance with the procedure described in Example 6. The yield was 1,320 ml of guanidine resin (nitrate form); the salt splitting capacity was 0.99 equivalent/1 and the total capacity was 2.1 equivalents/1 (in each case relative to the OH form).

It will be understood that the specification and examples are illustrative but not limitative of the present invention and that other embodiments within the spirit and scope of the invention will suggest themselves to those skilled in the art.

What is claimed is:

1. Process for the production of a strongly basic anion exchanger having guanidine groups which process comprises reacting a salt of a polymer containing at least one of the group consisting of primary and secondary amino groups, with a cyanamide reactant selected from the group consisting of cyanamide and alkylated cyanamide, in the presence of water, at a weakly acid pH value and at an elevated temperature.

2. Process as claimed in claim 1 wherein the cyanamide reactant is cyanamide and is used in the form of a cyanamide salt.

3. Process as claimed in claim 2, in which the salt is calcium cyanamide.

4. Process as claimed in claim 1 wherein an alkylated cyanamide is used, said alkylated cyanamide being a watersoluble monoalkyl or dialkyl cyanamide.

5. Process as claimed in claim 4 wherein said alkylated cyanamide contains up to six carbon atoms and not more than two carbon atoms per alkyl group.

6. Process as claimed in claim 4 wherein said alkylated cyanamide is monomethylcyanamide, monoethylcyanamide or dimethylcyanamide.

7. Process as claimed in claim 1 wherein said salt of said polymer is a hydrogen chloride salt.

8. Process as claimed in claim 1 wherein said polymer is a weakly basic anion exchanger and the amino groups contained therein are aliphatic amino groups.

9. Process as claimed in claim 1 wherein said polymer is a weakly basic anion exchanger and the amino groups contained therein are araliphatic amino groups.

10. Process as claimed in claim 1 wherein said polymer is a weakly basic anion exchanger based on a crosslinked aromatic vinyl polymer.

11. Process as claimed in claim 10 wherein said polymer contains more than one aminoalkyl group per aromatic nucleus.

12. Process as claimed in claim 1 in which 1 to 3 mols of the said cyanamide reactant are used per mol of the amino groups in the plymer.

13. Process as claimed in claim 1 wherein the reaction is effected in water or in a solvent inert to the cyanamide reactant.

14. Process as claimed in claim 1 wherein the reaction is effected at a pH of from 4.5 to 6.5.

15. Process as claimed in claim 15 wherein said pH is substantially 5.5.

16. Process as claimed in claim 1 wherein said reaction is effected at a temperature of from 60° to 130°C.

17. Process as claimed in claim 16 wherein said temperature is 80° to 100°C.

18. A strongly basic guanidine group containing anion exchanger resin comprising the reaction product of a weakly acidic salt of a polymer containing aromatic nuclei and containing more than one aminoalkyl group per aromatic nucleus therein, with a cyanamide reactant selected from the group consisting of cyanamide or an alkylated cyanamide, wherein said strongly basic anion exchanger contains more than one guanidine group per aromatic nucleus.

* * * * *